(12) United States Patent
Quillent et al.

(10) Patent No.: US 9,920,769 B2
(45) Date of Patent: Mar. 20, 2018

(54) CASING MADE OF ORGANIC MATRIX COMPOSITE MATERIAL THAT FACILITATES THE DISCHARGE OF SMOKE

(71) Applicant: SNECMA, Paris (FR)

(72) Inventors: Hélène Quillent, Paris (FR); Thomas Langevin, Bois le Roi (FR); Jean-Pierre André Joseph Mourlan, Madrid (ES); Adrien Paixao, Dammarie les Lys (FR); François Sfarti, Paris (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 15/105,756

(22) PCT Filed: Dec. 17, 2014

(86) PCT No.: PCT/FR2014/053397
§ 371 (c)(1),
(2) Date: Jun. 17, 2016

(87) PCT Pub. No.: WO2015/092280
PCT Pub. Date: Jun. 25, 2015

(65) Prior Publication Data
US 2017/0023013 A1    Jan. 26, 2017

(30) Foreign Application Priority Data

Dec. 20, 2013  (FR) .................................... 13 63213

(51) Int. Cl.
*F04D 29/52*    (2006.01)
*F02C 7/05*    (2006.01)
(Continued)

(52) U.S. Cl.
CPC ............ *F04D 29/526* (2013.01); *B64D 27/16* (2013.01); *F01D 25/005* (2013.01); *F01D 25/24* (2013.01);
(Continued)

(58) Field of Classification Search
CPC ...... F01D 25/14; F01D 25/145; F01D 25/005; F01D 29/526; F02C 7/25; B64D 27/16
See application file for complete search history.

(56) References Cited

U.S. PATENT DOCUMENTS 5,308,225 A * 5/1994 Koff .................. F01D 11/08
415/57.3
6,053,696 A * 4/2000 Roberts .............. F01D 21/045
415/200

FOREIGN PATENT DOCUMENTS

EP    1 961 923 A2    8/2008
FR    2 698 910 A1    6/1994
(Continued)

OTHER PUBLICATIONS

International Preliminary Report on Patentability and the Written Opinion of the International Searching Authority as issued in International Patent Application No. PCT/FR2014/053397, dated Jun. 21, 2016.
(Continued)

*Primary Examiner* — Justin Seabe
*Assistant Examiner* — Juan G Flores
(74) *Attorney, Agent, or Firm* — Pillsbury Winthrop Shaw Pittman LLP

(57) ABSTRACT

A gas turbine casing made of organic matrix composite material includes reinforcement densified by an organic matrix defines an inside volume. On its inside face the casing has a structural part with a first face facing the inside face of the casing, and an opposite second face defining a
(Continued)

flow passage portion. Recesses opening out into the inside volume of the casing are present between the inside face of the casing and the first face of the structural part facing the inside face of the casing. In the event of a fire, the recesses allow gas coming from degradation of the resin of the casing to be discharged into the flow passage.

9 Claims, 8 Drawing Sheets

(51) Int. Cl.
*F02C 7/25* (2006.01)
*B64D 27/16* (2006.01)
*F01D 25/00* (2006.01)
*F01D 25/24* (2006.01)

(52) U.S. Cl.
CPC ................ *F02C 7/05* (2013.01); *F02C 7/25* (2013.01); *F05D 2300/603* (2013.01); *Y02T 50/672* (2013.01)

(56) References Cited

FOREIGN PATENT DOCUMENTS

| FR | 2 976 974 A1 | 12/2012 |
| GB | 2 406 615 A1 | 4/2005 |
| WO | WO 2012/076876 A1 | 6/2012 |

OTHER PUBLICATIONS

International Search Report as issued in International Patent Application No. PCT/FR2014/053397, dated Apr. 16, 2015.

* cited by examiner

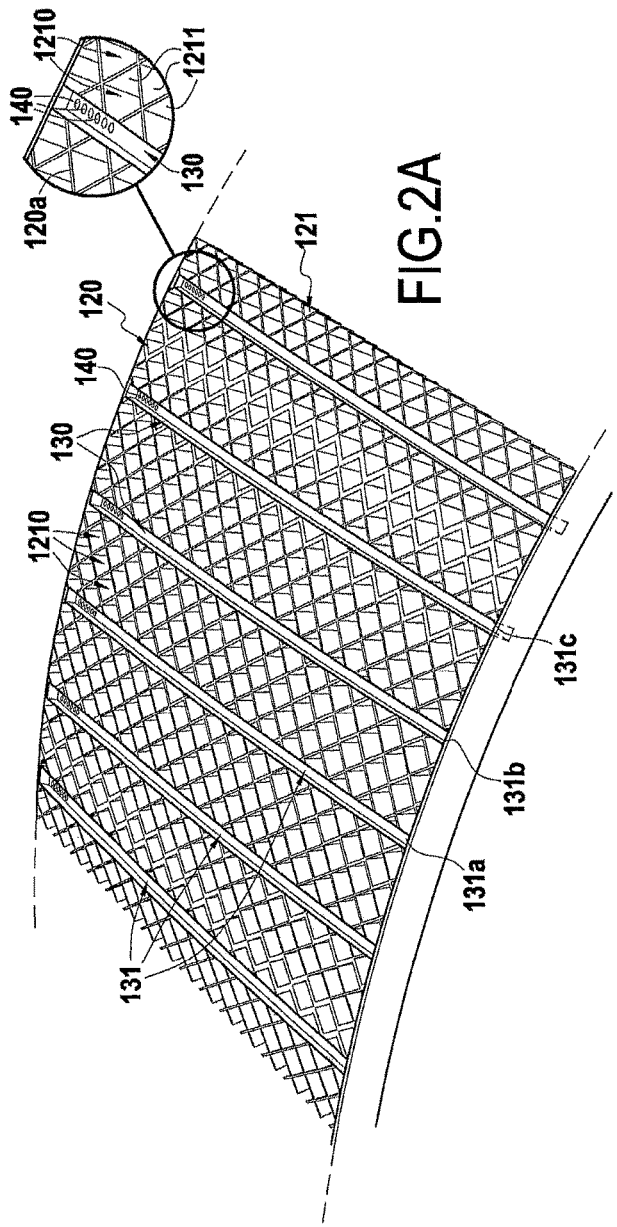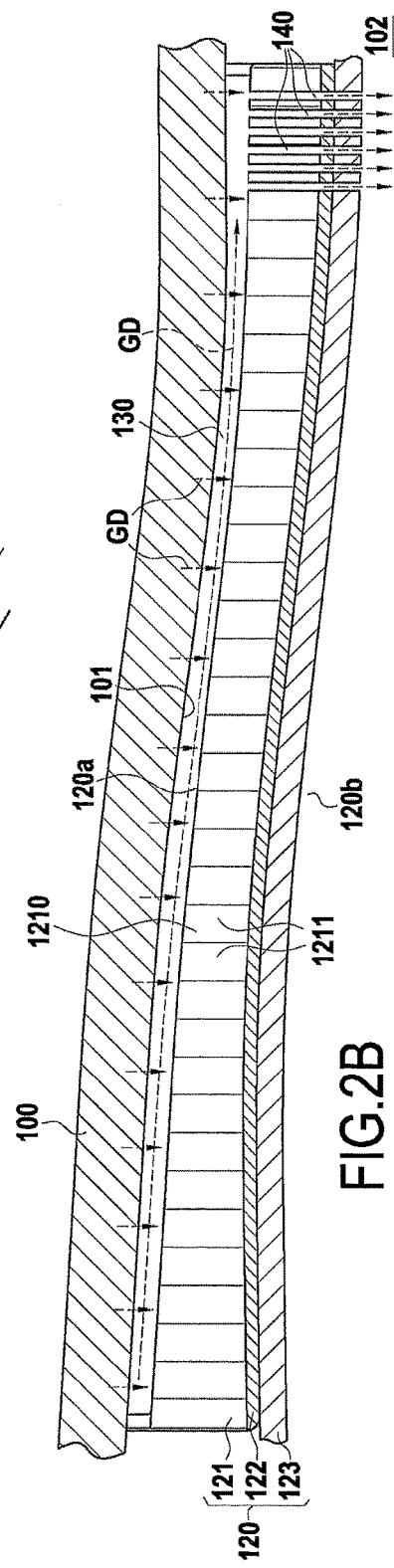

CASING MADE OF ORGANIC MATRIX COMPOSITE MATERIAL THAT FACILITATES THE DISCHARGE OF SMOKE

CROSS-REFERENCE TO RELATED APPLICATIONS

This application is the U.S. National Stage of PCT/FR2014/053397, filed Dec. 17, 2014, which in turn claims priority to French patent application number 1363213, filed Dec. 20, 2013. The content of these applications are incorporated herein by reference in their entireties.

BACKGROUND OF THE INVENTION

The invention relates to gas turbine casings, and more particularly, but not exclusively, to gas turbine fan casings for aeroengines.

In a gas turbine aeroengine, the fan casing performs several functions. It defines the inlet passage for admitting air into the engine, and it supports an abradable material facing the tips of the fan blades, the abradable material generally itself being supported by a cellular structure.

Casing such as fan casings used to be made out of metal material, but they are now made out of composite material, i.e. from a fiber preform densified by an organic matrix, thus making it possible to make parts of overall weight that is less than that of the same parts when they are made out of metal, while still presenting mechanical strength that is at least equivalent if not stronger. Fabricating a fan casing out of organic matrix composite material is described in particular in Document EP 1 961 923.

A fan casing is one of the parts defining a "fire" zone in the meaning of aviation certification. In this context, it must be considered as being a fire wall between the nacelle compartment situated on the outside of the casing and the flow passage defined on the inside of the casing, and it must satisfy the associated regulatory requirements.

Nevertheless, during fire testing, it has been found that extinguishing flames present on the outside of the casing, i.e. in the nacelle compartment of the engine, can be difficult, even after switching off the burner.

OBJECT AND SUMMARY OF THE INVENTION

It would thus be desirable to have available a solution enabling fire on the outside of the casing to be extinguished reliably.

Fire tests carried out by the Proprietor on test pieces made of organic matrix composite material have shown that the resin degrades while giving off gas. That gas is flammable, and it can lead to maintaining a flame even after the burner has been switched off.

For an aeroengine casing, structural parts, such as abradable and/or acoustic panels are fastened against the inside face of the casing by adhesive. Tests likewise carried out by the Proprietor have shown that, in the event of a fire, these parts bonded against the inside face of the casing have the effect of preventing discharge of the gas that results from degradation of the resin beside the passage, so that such gas is consequently discharged mainly on the outside of the casing, i.e. into the nacelle compartment where the fire is present. Since the gas is flammable, discharging it beside the flame can lead to the flame being maintained even after the engine has been shut down and extinction systems have been triggered. Thus, when in the presence of a part made of organic matrix composite material, it is desirable to give preference to discharging the gas that results from the resin degrading away from the flame zone.

To this end, the invention provides a gas turbine casing made of organic matrix composite material comprising reinforcement densified by an organic matrix, said casing defining an inside volume having on its inside face a structural part having a first face facing the inside face of the casing and an opposite second face defining a portion of the flow passage, the casing being characterized in that the face of the structural part facing the inside face of the casing includes grooves opening out directly or indirectly into the inside volume of the casing, and in that these grooves extend at least in the axial direction of the casing.

Thus, because of the presence of grooves opening out into the inside volume of the casing, gas resulting from degradation of the matrix of the casing in the presence of flames on the outside of the casing can be discharged into the passage, thereby avoiding disturbing extinction of the fire on the outside of the casing.

Additional grooves may extend in a direction perpendicular to these axial first grooves. In an aspect of the casing of the invention, the grooves open out at least at one axial end of the structural part. In another aspect of the casing of the invention, the grooves stop before the axial ends of the structural part and communicate with perforations opening out into the second face of the structural part.

In another embodiment of the casing of the invention, the structural part is bonded to the inside face of the casing via spacer studs, thereby making it possible to have recesses or spaces between the inside face of the casing and the structural part and enabling the gas given off during fire degradation of the matrix of the casing to be discharged into the passage.

In yet another embodiment of the casing of the invention, the inside face of the casing includes grooves that open out beyond the structural part.

In an aspect of the casing of the invention, the structural part comprises a cellular structure facing the inside face of the casing. Under such circumstances, the presence of recesses between the structural part and the inside space of the casing enables the gas given off during degradation of the matrix of the casing to pass through the cellular structure in order to be discharged into the passage. The structural part may also include a layer of abradable coating supported by the cellular structure.

Furthermore, the grooves may include gutters, e.g. made of a fiber texture consolidated by a matrix. This serves to seal the cellular structure in zones where it is no longer in contact with the wall of the casing.

Still in another embodiment of the casing of the invention, the structural part comprises a cellular structure facing the inside face of the casing, a skin closing the cells of the cellular structure beside the face of said cellular structure that is opposite from its face facing the inside face of the casing, the walls of the cells of the cellular structure including at least one perforation, the skin further including perforations opening out into the inside volume of the casing.

The invention also provides a gas turbine aeroengine having a fan retention casing of the invention, and an aircraft including one or more such engines.

BRIEF DESCRIPTION OF THE DRAWINGS

Other characteristics and advantages of the invention appear from the following description of particular embodiments of the invention given as non-limiting examples, and with reference to the accompanying drawings, in which:

FIG. 2A is a perspective view of a structural part in accordance with an embodiment of the invention;

FIG. 2B is a section view of an organic matrix composite material casing fitted with the structural part of FIG. 2A;

DETAILED DESCRIPTION OF EMBODIMENTS

The invention applies in general manner to any organic matrix composite material casing for a gas turbine and having on its inside face at least one structural part.

The invention is described below in the context of its application to a fan casing of a gas turbine aeroengine.

Figure 1A:
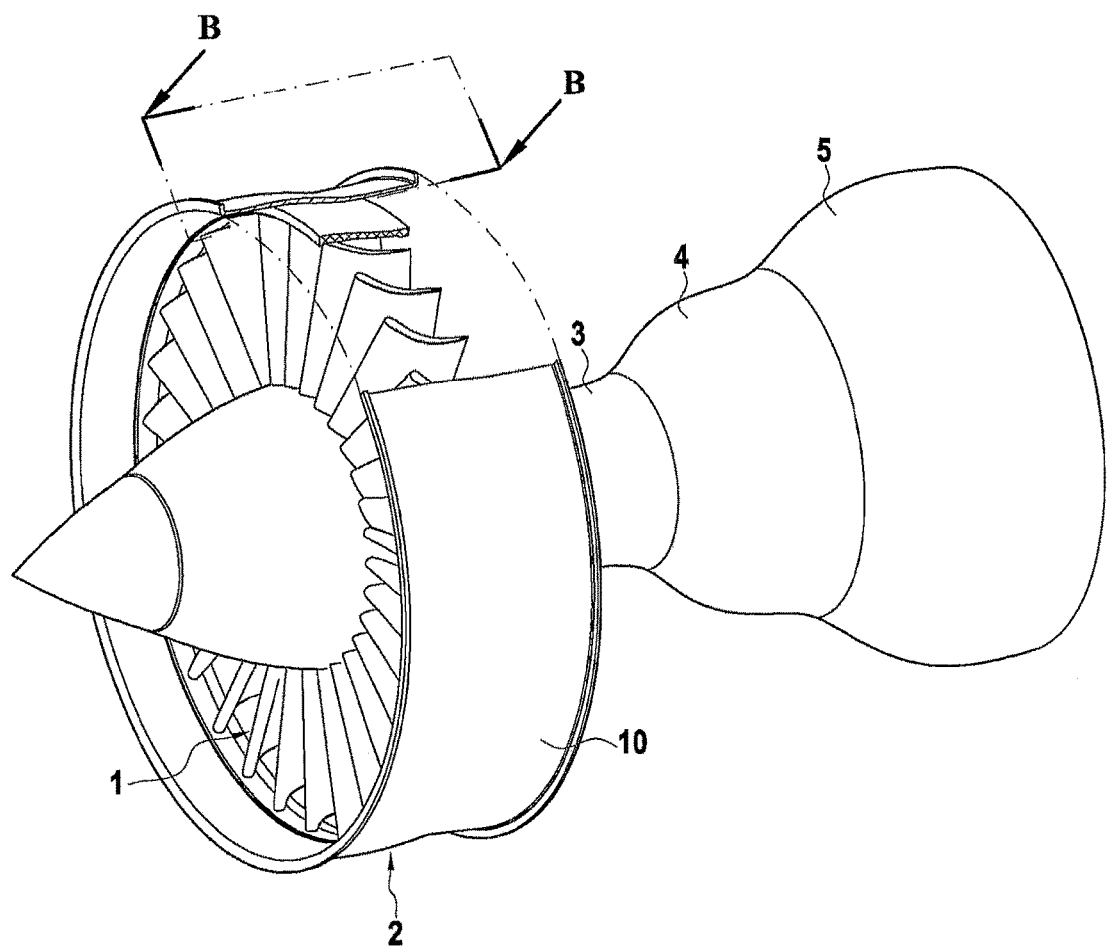
FIGS. 1A and 1B are respectively a perspective view and a section view of a prior art aeroengine fan casing.

Such an engine, as shown very diagrammatically in FIG. 1A, comprises from upstream to downstream in the gas stream flow direction: a fan 1 arranged at the inlet of the engine; a compressor 2; a combustion chamber 3; a high pressure turbine 4; and a low pressure turbine 5.

The engine is housed inside a casing made up of a plurality of portions corresponding to the various elements of the engine. Thus, the fan 1 is surrounded by a fan casing 10.

Figure 1B:
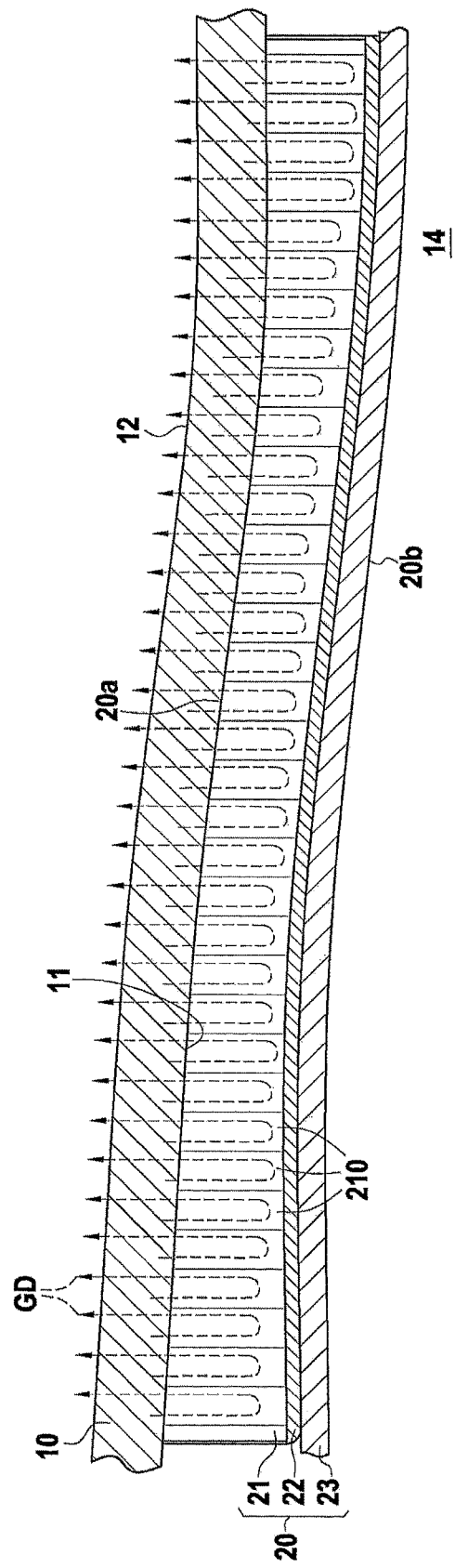

FIG. 1B shows the profile of the fan casing 10, which is made of organic matrix composite material, i.e. from fiber reinforcement, e.g. made of carbon, glass, aramid, or ceramic fibers, and densified by a polymer matrix, e.g. of epoxy, bismaleimide, or polyimide. Fabricating such a casing is described in particular in Document EP 1 961 923.

In the presently-described example, the inside face 11 of the casing 10 is provided with a structural part 20 made up of a cellular structure 21 and a layer of abradable material 23 fastened to the cellular structure by a skin 22, e.g. constituted by a layer of resin, and serving also to close the bottom portions of the cells 210 of the cellular structure 21, with the top portions of the cells being closed by the inside face 11 of the casing with which they are in contact. The structural part 20 comprises a first face 20a facing the inside face 11 of the casing 10, with the face 20a in this example corresponding to the high portions of the cells 210 of the cellular structure 21. The structural part has a second face 20b opposite from its face 20a and of shape that defines a portion of the flow passage 14.

In the presence of a flame beside the outside face 12 of the casing, the gas given off (arrows GD in FIG. 1E) during degradation constituting the matrix of the casing beside the inside face 11 of the casing cannot pass through the part 20 in order to reach the passage 14 through which it ought to be discharged. This gas is thus discharged mainly beside the outside face 12 of the casing 10, i.e. beside the flame, which then runs the risk of being sustained by the flammable degradation gas.

In accordance with an embodiment of the invention, as shown in FIGS. 2A and 2B, a casing 100 similar to the above-described casing 10 has on its inside face 101 a structural part 120 that differs from the above-described structural part 20 in that it includes grooves or corridors 130 in its first face 120a facing the inside face 101 of the casing 100, which grooves or corridors 130 are formed in the walls 1211 of the cells 1210 of the cellular structure 121, the grooves 130 extending in a direction parallel to the axial direction of the casing 100. The second face 120b opposite from the face 120a is constituted by the layer of abradable material 123 that is fastened to the cellular structure 121 via the skin 122. This second face 120b defines a portion of the flow passage 102. The grooves 130 enable the gas given off (arrows GD in FIG. 2B) during degradation of the organic matrix of the material of the casing to flow towards the downstream portion of the part 120 so as to be discharged via perforations 140, as shown in FIG. 2B. In the presently-described example, the perforations 140 are present in the layer of abradable material 123 at the downstream end of the part 120, and they enable the gas flowing in the grooves 130 to be discharged into the passage 102 situated in the inside volume of the casing 100.

In the presently-described embodiment, the grooves 130 comprise gutters 131 made of fiber texture, e.g. made of carbon fibers, consolidated by a matrix, e.g. an epoxy matrix. The gutters 131 may be made by using a fiber texture that has been pre-impregnated with a precursor resin for the matrix and that is shaped in the grooves so as to form a web 131a of the gutter from which there extend two gutter flanges or side walls 131b and 131c. The gutters 131 serve to seal the cellular structure in zones where it is no longer in contact with the wall of the casing, and they thus avoid allowing any moisture to penetrate into the cells of the cellular structure.

Figure 3:
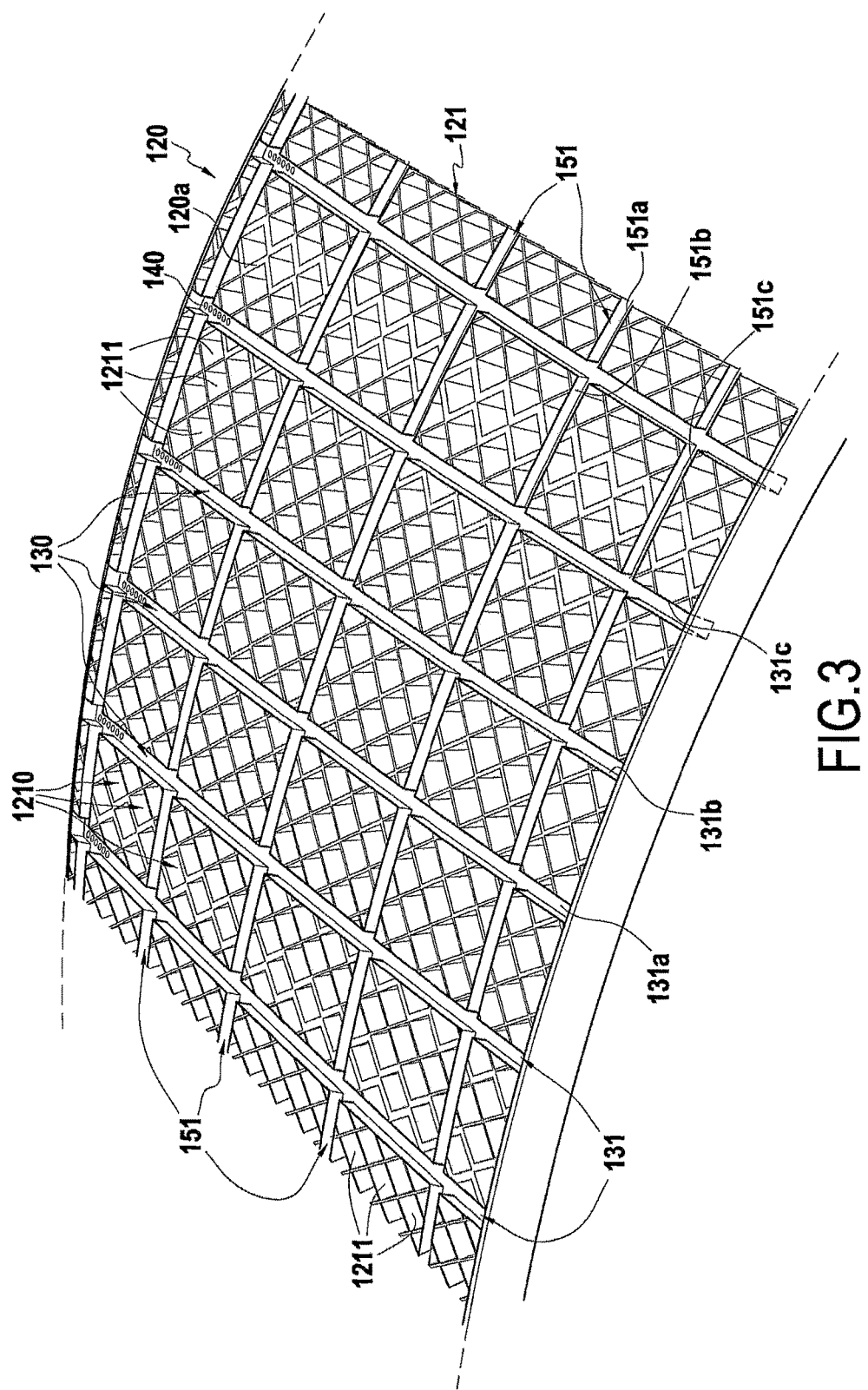
FIG. 3 is a perspective view of a structural part in accordance with an embodiment of the invention.

In a variant embodiment shown in FIG. 3, the structural part 120 also has additional grooves 150 in its face 120a that extends perpendicularly relative to the grooves 130, which themselves extend in the axial direction of the casing 100. Degradation gas from the casing 100 can thus flow both in the grooves 130 and in the grooves 150 so as to be discharged via the perforations 140, i.e. into the flow passage situated in the inside volume of the casing 100. In the presently-described embodiment, the grooves 130 and 150 comprise respective gutters 131 and 151 that are formed by a fiber texture, e.g. made of carbon fibers consolidated by a matrix, e.g. an epoxy matrix. The gutters 131 and 151 may be made using a fiber texture that has been pre-impregnated with a resin precursor for the matrix and that is shaped in the grooves so as to form respective gutter webs 131a and 151a, from which there extend respective pairs of side walls 131b & 131c and 151b & 151c. The gutters 131 and 151 serve to seal the cellular structure in zones where it is no longer in contact with the wall of the casing, and they thus avoid allowing any moisture to penetrate into the cells of the cellular structure.

Figure 4:
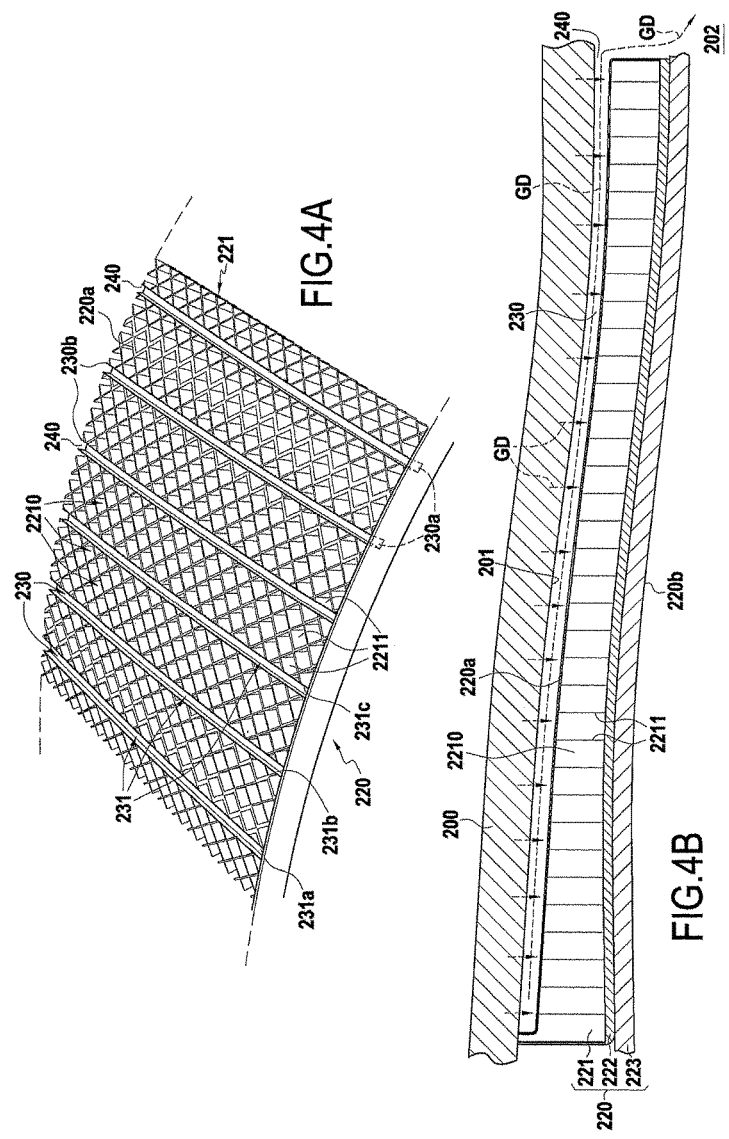
FIG. 4A is a perspective view of a structural part in accordance with an embodiment of the invention.
FIG. 4B is a section view of an organic matrix composite material casing fitted with the structural part of FIG. 4A.

In another embodiment of the invention, as shown in FIGS. 4A and 4B, a casing 200 similar to the above-described casing 10 has a structural part 220 on its inside face 201 that differs from the above-described structural part 20 in that it includes grooves or corridors 230 in its first face 220a facing the inside face 201 of the casing 200, which grooves or corridors 230 are formed in the walls 2211 of the cells 2210 of the cellular structure 221, the grooves 230 extending in a direction parallel to the axial direction of the casing 100. The second face 220b opposite from the face 220a is constituted by the layer of abradable material 223 that is fastened to the cellular structure 221 via the skin 222. This second face 220b defines a portion of the flow passage 202. The grooves 230 enable the gas given off (arrows GD in FIG. 4B) during degradation of the organic matrix of the material of the casing to flow towards the downstream portion of the part 220 so as to be discharged via openings 240 formed at the downstream end 230b of the grooves 230, the upstream ends 230a of the grooves 230 being closed. The degradation gas flowing in the grooves 230 is then discharged into the passage 202 situated in the inside volume of the casing 200. In the presently-described embodiment, the grooves 230 comprise gutters 231 that are made of a fiber texture, e.g. of carbon fibers consolidated by a matrix, e.g. an epoxy matrix. The gutters 231 may be made by using a fiber texture that has been pre-impregnated with a resin precursor for the matrix that is shaped in the grooves in order to form a gutter web 231a from which there extend two side walls 231b and 231c. The gutters 231 serve to seal the cellular structure in the zone where it is no longer in contact with the wall of the casing, and thus avoid allowing any moisture to penetrate into the cells of the cellular structure, in particular via the openings 240. In a variant embodiment of the protection against moisture, the cells present in the vicinity of the grooves 230 may be densified with an intumescent adhesive or a potting resin.

Figure 5:
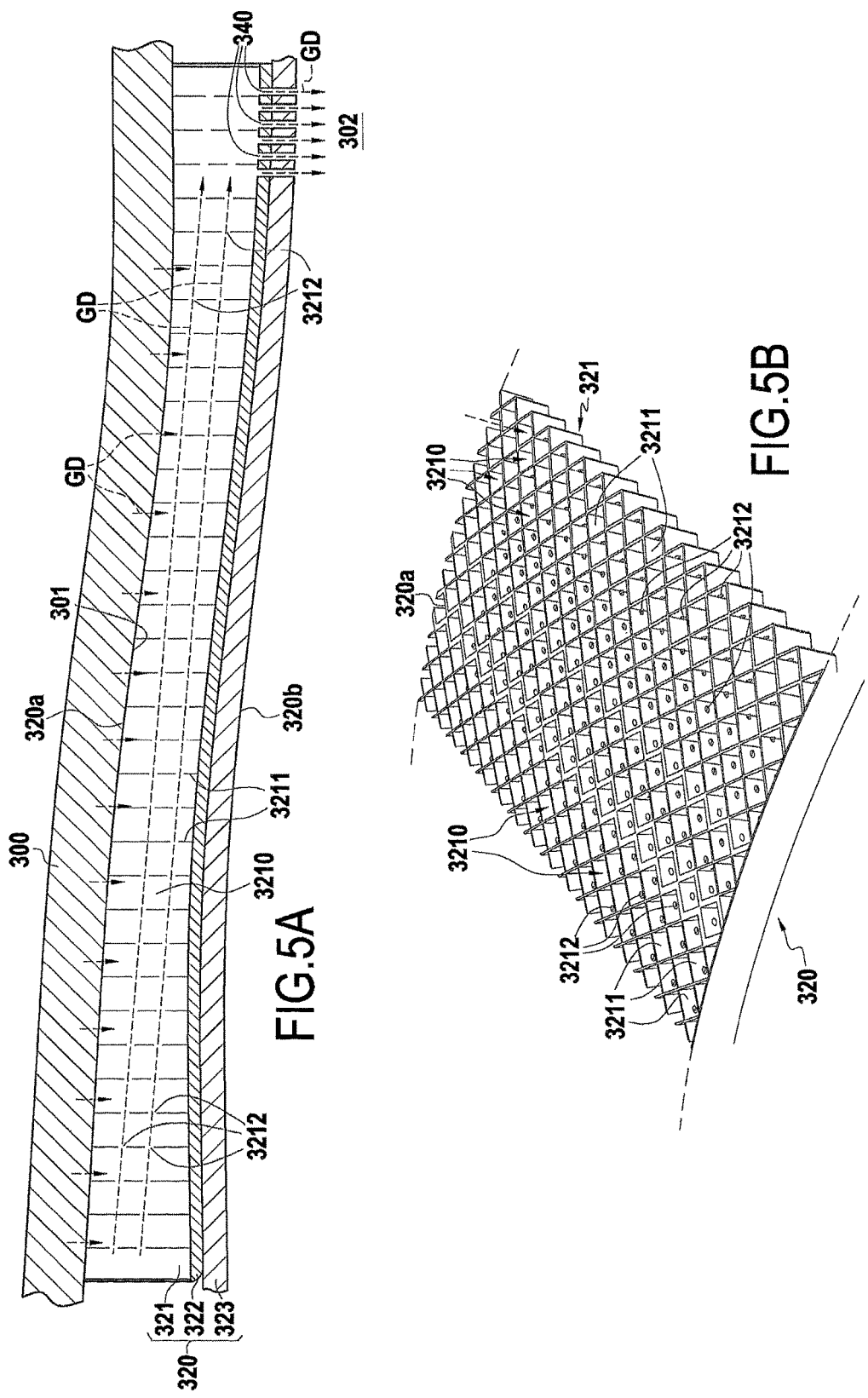
FIG. 5A is a section view of an organic matrix composite material casing fitted with the structural part in accordance with an embodiment of the invention.
FIG. 5B is a perspective view of the FIG. 5A structural part.

In another embodiment of the invention, shown in FIGS. 5A and 5B, a casing 300 similar to the above-described casing 10 has a structural part 320 on its inside face 301 that differs from the above-described structural part 20 in that each of the walls 3211 of the cells 3210 of the cellular structure 321 includes one or more perforations 3212. The second face 320b opposite from the face 320a and constituted by the layer of abradable material 323 defines a portion of the flow passage 302. The perforations 3212 enable the gas given off (arrows GD in FIG. 5B) during degradation of the organic matrix of the material of the casing and entering into the cells 3210 beside the face 320a of the part 320 to flow towards the downstream portion of the part 320 in order to be discharged via the perforations 340 as shown in FIG. 5B. In the presently-described example, the perforations 340 are present in the skin 322 and the abradable material layer 323 at the downstream end of the part 320, and they enable the gas flowing through the perforations 3212 formed in the cells 3210 to be discharged into the passage situated in the inside volume of the casing 300.

In the embodiments described above with reference to FIGS. 2, 3, 4, 5, and 6, the perforations are made at the downstream end of the structural part. Nevertheless, perforations could equally well be made at other locations in the structural part.

Figure 6:
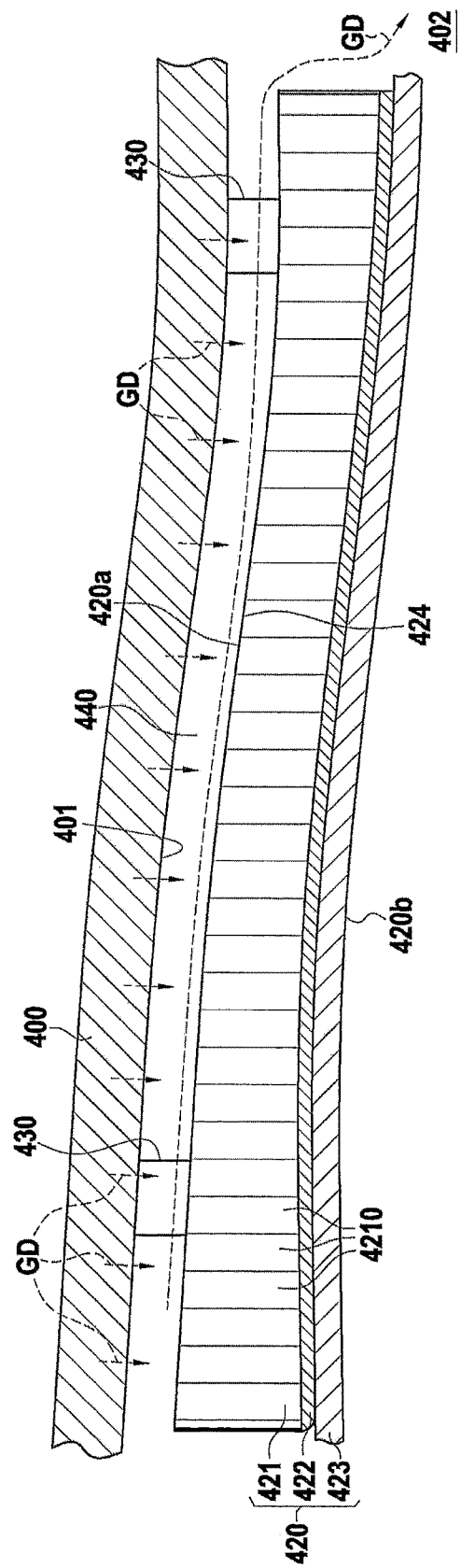
FIG. 6 is a section view of an organic matrix composite material casing fitted with a structure in accordance with an embodiment of the invention.
Figure 7:
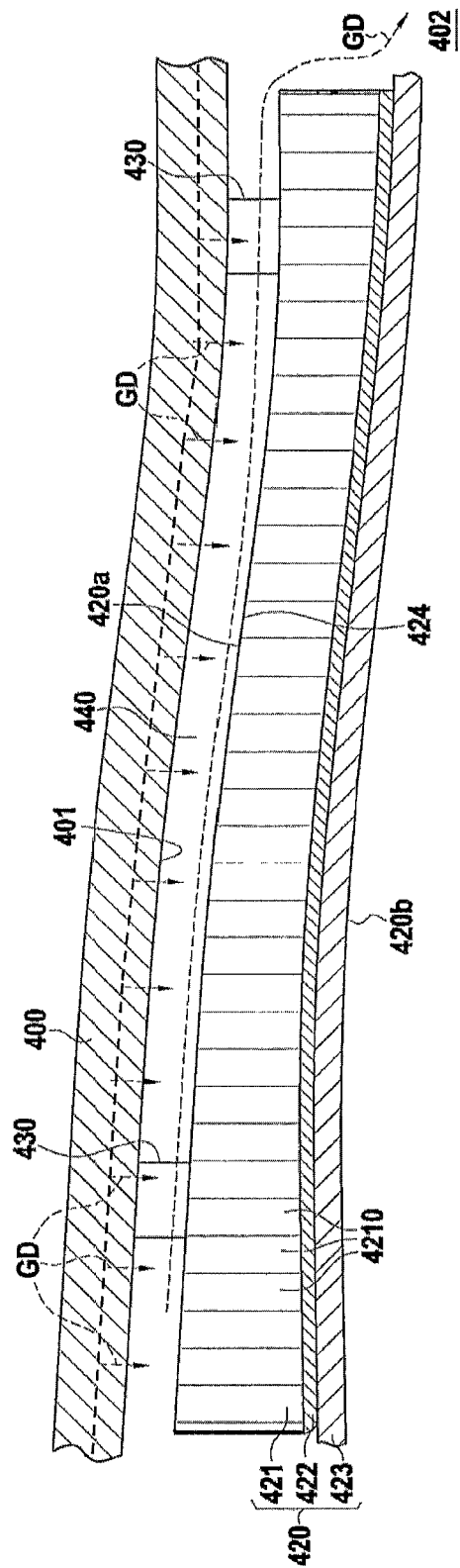
FIG. 7 is a section view of an organic matrix composite material casing fitted with a structure in accordance with an embodiment of the invention in which the casing has a groove.

In yet another embodiment of the invention, shown in FIG. 6, a casing 400 includes beside its inside face 401 a structural part 420 that is constituted by a cellular structure 421 and a layer of abradable material 423 fastened on the cellular structure by a first skin 422, e.g. made of carbon plies, that also serves to close the bottom portions of the cells 4210 of the cellular structure 421, which cells are closed in their top portions by a second skin 424, e.g. formed by carbon plies. The structural part 420 has a first face 420a facing the inside face 401 of the casing 410, the face 420a in this example corresponding to the top portion of the cells of the cellular structure 421. The structural part has a second face 420b opposite from the face 420a of shape that defines a portion of the flow passage 402.

In this embodiment, the structural part 420 is fastened to the casing via spacer studs 430 that are adhesively bonded firstly to the inside face 401 of the casing 400 and secondly to the face 420a of the part 420, which in this example is constituted by the second skin 424. The spacer studs 430 are preferably adjustable in height so as to control clearances and interaction with the tips of the turbine blades. By using spacer studs 430, a corridor or recess 430 is formed between the face 420a of the part 420 and the inside face 401 of the casing 400, thus enabling the gas give off (arrows GD in FIG. 6) during degradation of the organic matrix of the casing material to flow towards the downstream portion of the part 420 in order to be discharged into the passage 402.

In still another embodiment, the inside face of the casing includes grooves that open out beyond the structural part. This embodiment may optionally be combined with the other embodiments described above.

The invention claimed is:

1. A gas turbine casing made of organic matrix composite material comprising reinforcement densified by an organic matrix, said casing defining an inside volume having on its inside face a structural part having a first face facing the inside face of the casing and an opposite second face defining a portion of a flow passage, wherein the first face of the structural part facing the inside face of the casing includes grooves defining a flow path between the inside face of the casing and the first face of the structural part, the flow path extending directly or indirectly into the inside volume of the casing, and wherein said grooves extend at least in an axial direction of the casing and extend to at least at one axial end of the structural part.

2. A casing according to claim 1 wherein the grooves stop before axial ends of the structural part, the grooves including perforations in the second face of the structural part.

3. A casing according to claim 1, wherein first grooves extend in the axial direction of the casing, and wherein second grooves extend perpendicularly to the first grooves.

4. A casing according to claim 1 wherein the inside face of the casing includes grooves that extend beyond the structural part.

5. A gas turbine aeroengine having a gas turbine casing according to claim 1.

6. An aircraft including one or more engines, each engine having a gas turbine casing according to claim 1.

7. A gas turbine casing made of organic matrix composite material comprising reinforcement densified by an organic matrix, said casing defining an inside volume having on its inside face a structural part having a first face facing the inside face of the casing and an opposite second face defining a portion of a flow passage, wherein the first face of the structural part facing the inside face of the casing includes grooves defining a flow path between the inside face of the casing and the first face of the structural part, the flow path extending directly or indirectly into the inside volume of the casing, and wherein said grooves extend at least in an axial direction of the casing wherein the structural part comprises a cellular structure facing the inside face of the casing.

8. A casing according to claim 7, wherein the grooves comprise gutters.

9. A casing according to claim 7 wherein the structural part further includes an abradable coating layer.

* * * * *